Figure 1:
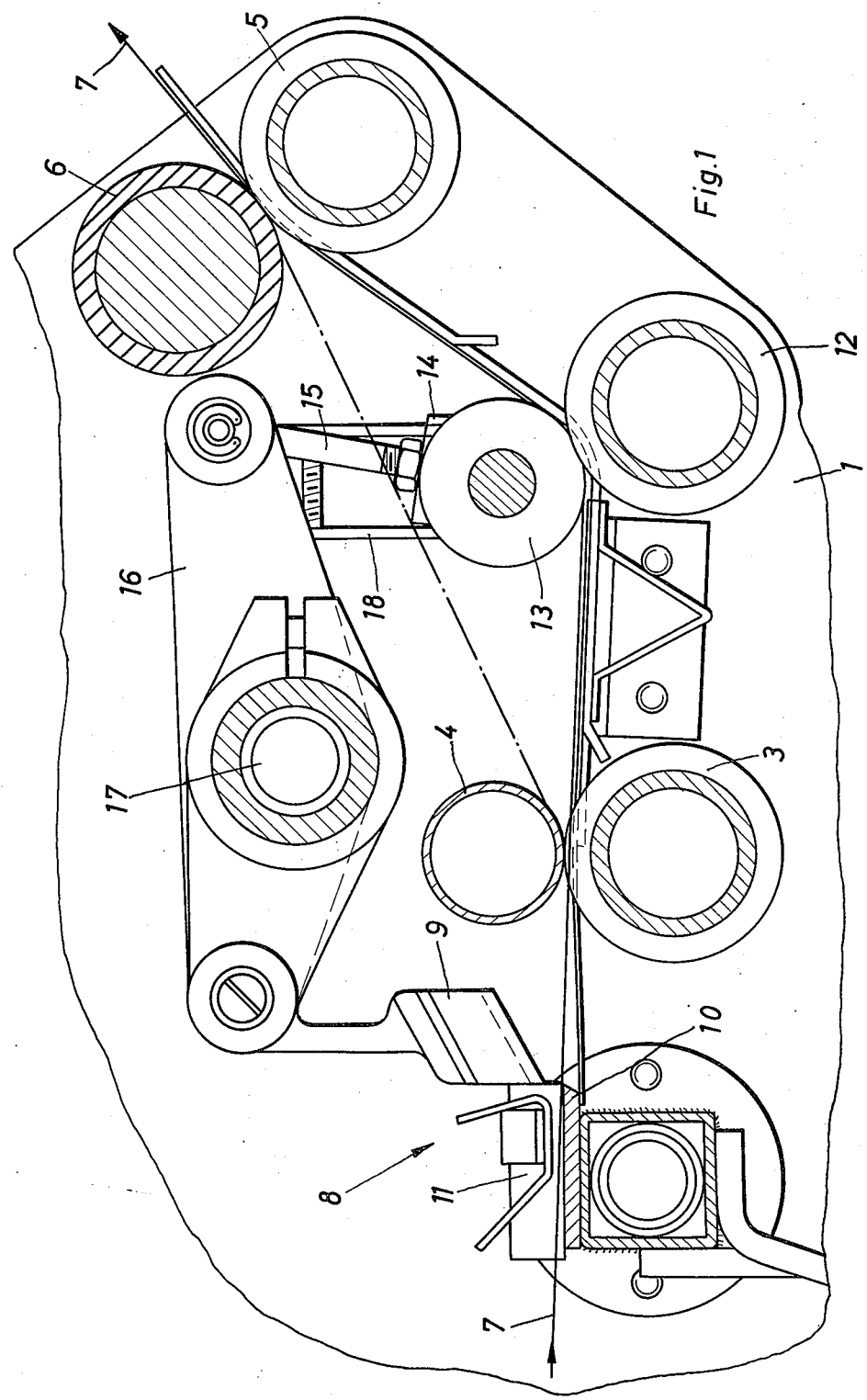

United States Patent [19]

Schleifenbaum

[11] 3,911,771

[45] Oct. 14, 1975

[54] TRANSPORT AND SHEARING APPARATUS

[75] Inventor: Karl Schleifenbaum, Haiger, Germany

[73] Assignee: Firma Meteor-Siegen Apparatebau Paul Schmeck GmbH, Siegen, Germany

[22] Filed: May 2, 1974

[21] Appl. No.: 466,165

[30] Foreign Application Priority Data

June 22, 1973 Germany............................ 2331653

[52] U.S. Cl. ......................... 83/81; 83/156; 83/261
[51] Int. Cl.².. B23D 33/02; B23Q 7/14; B26D 5/22
[58] Field of Search ......... 83/81, 82, 156, 150, 202, 83/203, 205, 261

[56] References Cited
UNITED STATES PATENTS 3,098,405 7/1963 Lyon et al.............................. 83/236
3,191,475 6/1965 Scott et al.......................... 83/261 X Primary Examiner—J. M. Meister
Attorney, Agent, or Firm—Olson, Trexler, Wolters, Bushnell & Fosse, Ltd.

[57] ABSTRACT

The continuous strip or web of material is drawn off a magazine as in a photo-printing machine. The strip is fed by two pairs of transport rollers spaced along the feed path. A deflector roller is located between the pairs of transport rollers and is movable between an operative position and an inoperative position to vary the strip path length between the pairs of transport rollers, and thus to vary the length of material cut off by a shearing device positioned adjacent the upstream pair of transport rollers.

4 Claims, 2 Drawing Figures

TRANSPORT AND SHEARING APPARATUS

The invention relates to equipment for the transport and shearing of printing material drawn off a magazine as a continuous strip; the invention is thus applicable to, but not limited to, a photo-printing machine, such as that described in British Pat. specification No.1230745.

The invention is concerned with transport and shearing equipment having two, spaced apart, pairs of transport rollers, a deflector roller situated between the said pairs of transport rollers and movable in the direction required to alter the length of the path between them, and a shearing device situated in the vicinity of the upstream pair of rollers in the feed direction.

If the printing paper in modern automatic photo-printing apparatus has to be drawn off a magazine roll during the printing process and cut off to the length required by the original document, the shearing operation usually has to be effected while the printing paper continues uninterruptedly on its way through the exposure station. In order nevertheless to obtain a straight cut and an accurate length of printing paper, a length of the printing material is stored between the shearing station and the exposure station by a deflection operation, i.e., there is an artificial increase in the feed path between those stations; when the required length of printing material has been reached the pair of transport rollers which feed the paper forward and is adjacent to the shearing device if brought to a stop, so that the material can be neatly and accurately cut while stationary, while the temporarily stored printing paper is consumed and its passage through the exposure station is thus not impeded by the temporary stoppage of the trailing end of the material.

Various proposals have been made for deflecting the printing material in order to supply a temporary store of that material. Thus it is suggested in German Utility Model No. 1984436 to have the first pair of transport rollers, adjacent to the shearing device, to run at a somewhat higher speed than the second pair, which effects the transport of the material to be photo-printed through the exposure station. A loop of printing paper is thus built up between the pairs of transport rollers, the length of the loop being determined by the overall length of the original material; in view of the necessity of providing sufficiently large loops with short originals, a complicated loop correcting operation is necessary to prevent excessively large loops when the originals are long. In addition this system does not make it possible to obtain printed sheets of exactly the same length as the original or master from which they are printed.

That essential requirement, on the other hand, is fulfilled by the device described in German Patent Specification No. 1802744, in which a loop of printing paper of constant and accurately determined length is built up, in accordance with the end of the original, by an acceleration which is accurately controlled over the required distance, and the subsequent stopping, of the first pair of transport rollers. This device, however, naturally involves by no means negligible expense.

Fundamentally similar principles form the basis of the apparatus known from German Pat. Specification No. 2212957, in which, at the beginning of each printing operation, a loop of printing paper of a given length is formed by causing the second pair of transport rollers to come into operation a given time after the printing paper has been fed to it by the first pair. The drawback of this system resides not only in expense which is here again incurred for the apparatus required but also in the fact that the printing paper must in all cases pass completely through the loop and that even slight irregularities during the further feed, such as slip differences between first and second pair of transport rollers, lead to changes in the length of the loop, causing inaccuracy in the length of the printing sheet after shearing.

In other systems suggested for the intermediate storage of the printing material by means of deflection, use is made of the "tensor roller": a deflector roller guides the strip material, between two pairs of transport rollers, along a detour of which the length is equivalent to the amount of material to be temporarily stored. The deflector roller is biased, as by a spring or a weight, in the direction in which the material is to be deflected; the detour is shortened, against the action of the bias, if for any reason that pair of transport rollers which is situated behind the tensor roller, as viewed in the direction of feed, transports the material more rapidly than the pair of transport rollers in front of the tensor roller.

It is true that this system, by comparison with that in which a free loop is formed, offers the advantage of involving less expenditure on apparatus and neverthehless of enabling an exactly definable length of printing material to be stored, but it suffers from the drawback that the transport of the material thus temporarily stored has to take place during the cutting operation (i.e., while the first pair of transport rollers is at a standstill) and in opposition to the bias of the tensor roller; as a result, slip may occur in the second pair of transport rollers, causing delays in the feed action in the exposure station and irregularity in the exposure rate. A variation of this system is suggested in German Utility Model No.7107020, in which the deflector roller is replaced by a deflector plate; the friction which the material to be printed exerts against this latter, however, merely aggravates the drawback previously mentioned.

The present invention resides in equipment for the transport and shearing of printing material drawn off a magazine roll as a continuous strip, which equipment comprises two pairs of transport rollers which are spaced from one another along the feed path of the strip, a deflector roller which is located between the pairs of transport rollers and which is movable between an operative position and an inoperative position to vary the strip path length between the pairs of transport rollers, a shearing device situated adjacent the first of the pairs of transport rollers in the feed direction, and an automatic guide system arranged to move the deflector roller from the operative position towards the inoperative position in order to decrease the strip path length when the shearing device is actuated and the first pair of transport rollers is brought to a stop. The invention thus makes it possible to combine the advantages which a free loop provides as regards its movement while being consumed during the cutting operation, with the advantages which the storage of material by guided deflection offers, as regards the apparatus involved.

The deflector roller preferably co-operates, in its operative position, with a further transport roller, which is driven, and thus forms, in conjunction with the latter, a third pair of transport rollers. This facilitates the production of a comparatively tension-free deflector loop.

It has also been found advantageous for the deflector roller to be guided along a linear path in a slide guide. A direct combination of the linear movement of the deflector roller with the movable blade of the shearing device, by having the movable blade and the deflector roller pivoted to opposite ends of a rocker lever, offers particular advantages.

Figure 2:
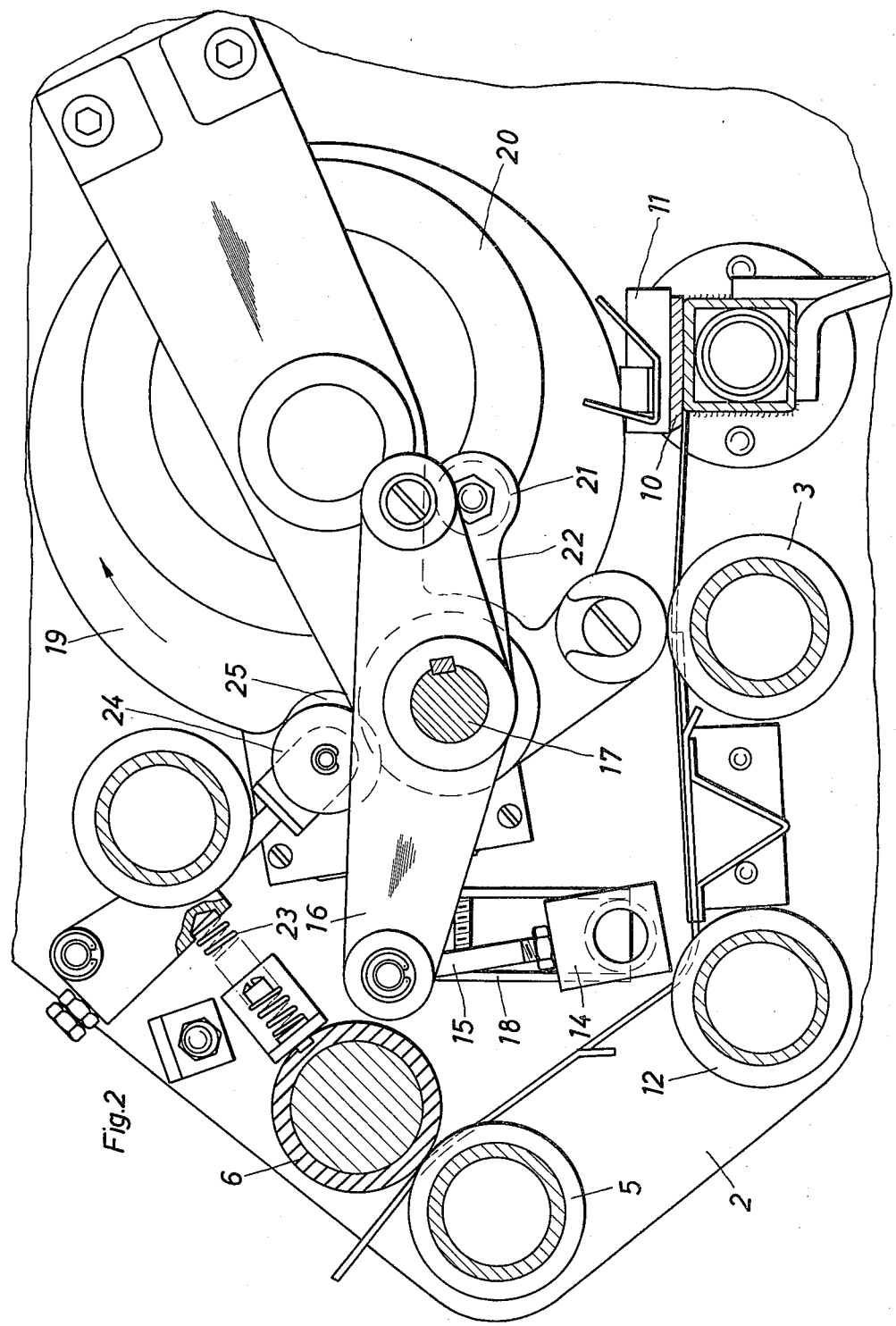

The invention will be more readily understood by way of example from the following description of transport and shear equipment in accordance therewith, reference being made to the accompanying drawings, in which:

FIG. 1 is a vertical section through the transport and shear equipment of a photo-printing machine, showing the bearing plate on one side of the equipment, and FIG. 2 is a section corresponding to FIG. 1, but as viewed in the opposite direction, and showing the bearing plate on the other side of the equipment.

In the drawings, 1 and 2 are the bearing plates of a photo-printing machine.

The bearing plates are spaced apart and support transport rollers which move printing material from a storage roll through the equipment. The spacing of the plates 1 and 2 are such that printing material of the maximum width to be printed can be transported between them. The transport rollers shown in the drawings are a first pair consisting of a driven roller 3 and an idler roller 4, and a second pair consisting of a driven roller 5 and a co-operating roller 6. Those parts of the photo-printing machine, other than the transport and shearing equipment are not shown in the drawings.

A shear device 8 precedes the first pair of transport rollers 3 and 4 in the feed direction of the material, which is illustrated by a continuous line, and consists of a vertically movable blade 9 and a fixed anvil 10; the blade 9 is biased at its outer end towards the left as viewed in FIG. 1 and against stops 11, being thus guided as required in relation to the anvil 10. The fact that the shear device 8 is situated upstream of the first pair of transport rollers 3 and 4 ensures that the material 7 to be printed will remain stationary in the zone of the blades during the cutting process, not only in the feed direction but also transversely thereto.

Between the pairs of transport rollers 3, 4 and 5, 6 is a third pair of transport rollers consisting of a driven roller 12 and a deflector roller 13. As may be seen from FIG. 1, the deflector roller 13, when in the operative position shown, deflects the material 7 from its shortest path, shown by dot-and-dash lines, between the pairs of transport rollers 3, 4 and 5, 6 and causes it to move over a longer path. As all the driven rollers 3, 12 and 5 rotate synchronously during transport of the material, no tension beyond the resistance due to transport is exerted on the material 7.

The deflector roller 13 is mounted at its ends in bearing blocks 14 which are articulated by thrust rods 15 to one end of a rocking lever 16, to the other end of which is pivoted the movable blade 9 of the shear device 8 and which is pivotable about shaft 17. The bearing blocks 14 of the deflector roller 13 are also guided along a linear path in guides 18 by the aid of slide blocks (not shown).

When the rear edge of a master document moving through the photo-printing machine has passed a feeler, a signal is emitted which actuates the shear device 8 and causes the rocker lever 16 to pivot about shaft 17 (anti-clockwise in FIG. 1 and clockwise in FIG. 2). Before the movable blade 9 commences the cutting operation, the deflector roller 13 has moved from its operative position adjacent the driving roller 12 and terminated the feed action at that point. The cutting signal also causes the pair of transport rollers 3 and 4 to be brought to a stop, so that the shearing operation takes place in the shear device 8 with the material 7 at a standstill. As the blade 9 rapidly descends, the deflector roller 13 moves vertically upwards towards an inoperative position in which it exerts no deflecting action and in which the material 7 takes the shortest route between the stationary pair of transport rollers 3, 4 and the pair of transport rollers 5, 6 which continues to drive the material. This automatic movement of the deflector roller converts into a free loop the material previously stored by the deflector roller in its operative position and therefore having a defined length, so that when the pair of transport rollers 3 and 4 are brought to a stop the material 7 is not subjected to any tension likely to give rise to sporadic movement of the material.

The rocker lever 16 and thus the blade 9 and the deflector roller 13 are controlled by means of a cam disc 19 (FIG. 2). The cam disc 19 has milled in its face a cam path 20, which receives a cam follower roller 21 carried at the end of a lever 22 which is operatively connected with the lever 16 and is also pivotable about the shaft 17. The shape of the path 20 is so selected that the blade 9 and the deflector roller 13 are operated with sufficient rapidity, without the accompanying mass accelerations and mass retardations becoming excessive. In each shearing operation the cam disc 19 performs a full rotation; at the end a roller 24, subject to the action of a spring 23, engages an indexing recess 25 in the outer periphery of the cam disc 19; this system provides a slight over-swing of the cam disc 19 and of the flywheel masses controlled by it, and thus prevents any sudden braking action but nevertheless ensures a defined initial position for the next shearing cycle.

I claim:

1. Equipment for the transport and shearing of printing material drawn off a magazine roll as a continuous strip, which equipment comprises two pairs of transport rollers which are spaced from one another along the feed path of the strip, a deflector roller which is located between the pair of transport rollers and which is movable between an operative position and an inoperative position to vary the strip path length between the pairs of transport rollers, a shearing device situated adjacent the first of the pairs of transport rollers in the feed direction, and an automatic guide system arranged to move the deflector roller from the operative position towards the inoperative position in order to decrease the strip path length when the shearing device is actuated and the first pair of transport rollers is brought to a stop, said shearing device comprising a movable blade which is operatively connected to the deflector roller so that cutting movement of the blade is accompanied by movement of the deflector roller from its operative position, said blade being pivoted adjacent one end of a rocker lever, the deflector roller being pivoted adjacent the other end of that lever.

2. Transport and shearing equipment according to claim 1, in which there is a further transport roller disposed to co-operate with the deflector roller when in its operative position.

3. Transport and shearing equipment according to claim 1, in which the rocker lever carries a cam follower movable over a cam disc, which is arranged to execute a rotation when a required length of the strip has been fed.

4. Equipment for the transport and shearing of printing material drawn off a magazine roll as a continuous strip, which equipment comprises two pairs of transport rollers which are spaced from one another along the feed path of the strip, a deflector roller which is located between the pair of transport rollers and which is movable between an operative position and an inoperative position to vary the strip path length between the pairs of transport rollers, a shearing device situated adjacent the first of the pairs of transport rollers in the feed direction, and an automatic guide system arranged to move the deflector roller from the operative position towards the inoperative position in order to decrease the strip path length when the shearing device is actuated and the first pair of transport rollers is brought to a stop, a further transport roller disposed to co-operate with the deflector roller when in its operative position, the shearing device comprising a movable blade which is operatively connected to the deflector roller so that cutting movement of the blade is accompanied by movement of the deflector roller from its operative position, and in which the blade is pivoted adjacent one end of a rocker lever, the deflector roller being pivoted adjacent the other end of that lever.

\* \* \* \* \*